United States Patent [19]

Taylor

[11] 3,926,287
[45] Dec. 16, 1975

[54] HYDRAULIC TRANSMISSION

[76] Inventor: Scott V. E. Taylor, 7516 Eton Ave., Canoga Park, Calif. 91302

[22] Filed: Aug. 22, 1973

[21] Appl. No.: 390,429

[52] U.S. Cl. .................. 192/61; 60/325; 60/330; 418/61 R
[51] Int. Cl.² ........................................ F16D 31/04
[58] Field of Search ............ 60/325, 330, 337, 361, 60/364, 365, 366, 456, 435, 487; 192/61; 415/52, 56, 98

[56] References Cited
UNITED STATES PATENTS

| | | | |
|---|---|---|---|
| 2,437,448 | 2/1948 | Taylor | 192/61 |
| 2,502,364 | 2/1950 | Bannister | 60/361 |
| 3,026,679 | 2/1962 | Howard | 60/337 |
| 3,045,430 | 7/1962 | Becker | 60/337 |
| 3,113,524 | 12/1963 | Fulton | 418/189 |
| 3,202,018 | 4/1965 | Hilpert | 192/85 AA |
| 3,710,907 | 1/1973 | Andersen | 192/86 |

OTHER PUBLICATIONS

Re 20,988, S. V. E. Taylor, Jan. 24, 1939.

Primary Examiner—C. J. Husar
Assistant Examiner—Edward Look
Attorney, Agent, or Firm—Lowell G. Turner

[57] ABSTRACT

An improved hydraulic transmission of the jet reaction type wherein a rotor-mounted bi-directional scoop forceably directs working fluid to a pressure relieved gear pump, that working fluid being then ejected by the pump into a jet reaction area and separated into two components by a splitter, each fluid component being turned into impingement against a vane fixed to the rotor and shaped to maximize energy capture potential. Cooling fins upon the exterior of a housing are shaped to efficiently capture air and to cool the transmission.

12 Claims, 5 Drawing Figures 3,926,287

HYDRAULIC TRANSMISSION

BACKGROUND OF THE INVENTION

This invention is directed to mechanical and operational improvements in a basic hydraulic transmission disclosed in my U.S. Pat. Nos. Re 20,988 issued Jan. 24, 1939 and 2,437,448 issued Mar. 9, 1948. The teachings of these two patents are incorporated herein by reference for the teachings which they contain.

Within the past several years it has become particularly important that power production equipment, especially that which utilizes fossil fuels, be as efficient in operation as possible in order that fuel economies may be maximized. Whether it be the power production equipment per se or the power train accessory equipment is irrelevant, since any inefficiencies within the system result in increased fuel consumption.

While the hydraulic transmission of my above-mentioned patents, particularly the latter-identified patent, incorporated efficiencies of significant proportions, certain improvements thereto are nevertheless capable of accomplishment to further facilitate a reduction in operating friction and an increased potential for capturing and utilizing a maximum amount of that energy produced within the system.

Thus, it is a primary objective of this invention to improve the structural components and thereby the operating efficiency of a hydraulic transmission.

Another object is to increase that efficiency by decreasing hydraulic friction within the transmission.

A further object is to provide means whereby operating fluid within the system is picked up and introduced to the pump in an efficient manner and to relieve fluid pressure in the pump, thereby preventing hammering in the pump.

Another object is to provide means upon the periphery of a rotor whereby energy potential capture is improved through the impingement of that jet upon structural deflectors.

Yet another object is to provide mechanical scoops, splitters and deflectors in combination with the intakes, exhausts and pumps of this system for the production of optimum torque characteristics.

These and other objects of invention will become apparent upon examination of the accompanying specification, drawings, and claims.

SUMMARY OF THE INVENTION

This invention generally encompasses a system having a drive shaft and a driven shaft, the drive shaft being connected in rotary relation to a closed, cup-shaped housing and the driven shaft connected for rotation with a rotor in coaxially rotatable relationship with respect to the driven shaft and the housing.

Hydraulic fluid contained within the housing intermediate of that housing and the rotor is scooped therefrom by rotor-mounted bi-directional scoop means and directed into passages shaped and directed for efficient impingement of the hydraulic fluid into a gear pump region, from whence it is pumped in pressure-relieved relation through a second appropriately shaped and curved passageway. The pumped fluid is exited in a jet reaction from the periphery of the rotor, at which juncture splitter means is provided to separate the jet stream into equal components and to efficiently direct it against rows of jet reaction vanes fixed to the rotor structure.

Cooling fins are provided upon the exterior of the cup-shaped member for efficiently cooling the total structure.

The hydraulic transmission described herein is usable in an entirely automatic relationship with respect to a power-production unit and the structure driven thereby, intermediate of which this transmission is positioned.

DETAILED DESCRIPTION OF THE DRAWINGS

Figure 1:
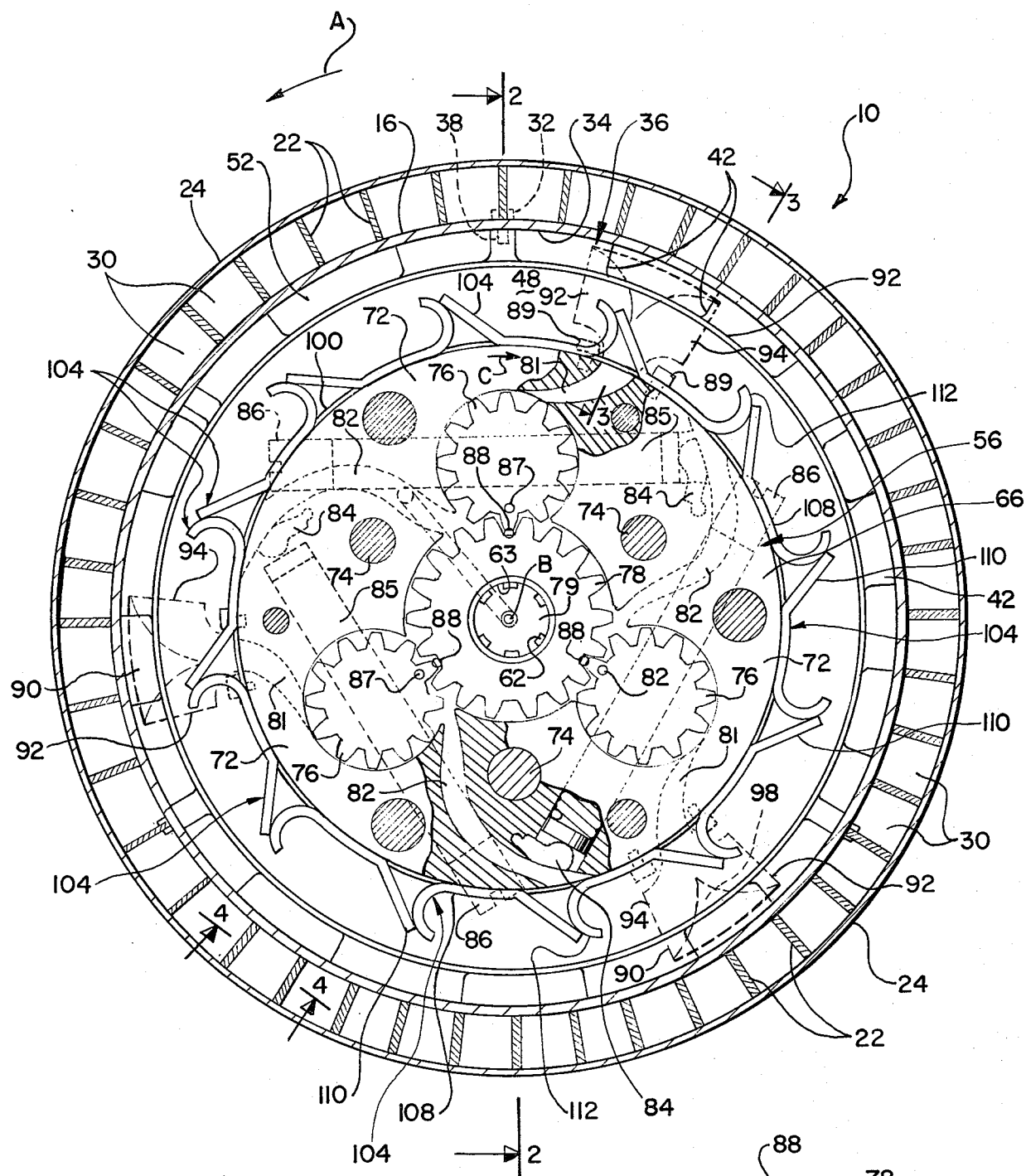
FIG. 1 is a sectional elevation of the transmission of this invention in plan view, partially cut away to better illustrate the components thereof.

The invention is illustrated and described in relation to a particular embodiment which includes a plurality of components collectively combined to define the transmission system. Although this system is described in a preferred embodiment it will be readily recognized that departures therefrom, as hereinafter indicated or as may be otherwise obvious in view of the circumstances of its utilization, can be made without departing from either the spirit or the scope of the invention.

Referring now to the drawings in detail, the numeral 10 is intended to indicate the complete hydraulic transmission system. A drive shaft 12, normally driven in the direction of the arrow A, it fixedly attached by bolts 14 to a generally cup-shaped casing 16 closed at its open end by a cover 18 and secured thereto by bolts 20.

Figure 4:
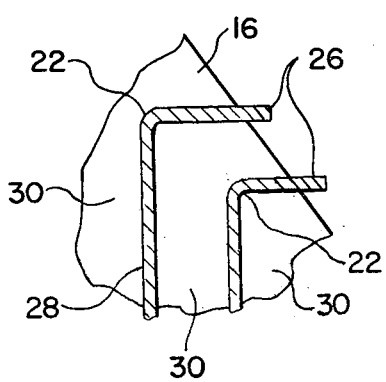
FIG. 4 is an edge view of a typical fin arrangement, as taken along line 4—4 in FIG. 1.

The casing 16, which is connected for rotation with the drive shaft 12, includes upon its outer periphery a series of cooling vanes 22, welded or otherwise fixed to the casing and to a shell 24 peripherally surrounding the same. The cooling vanes 22, as better illustrated in FIG. 4, and which may be described as substantially chevron-shaped, include an entry portion 26 directed at an acute angle from the longitudinal axis B of the transmission. Each vane 22 also includes a rearward air flow control portion 28 oriented at approximately 90° from the entry portions 26. In the usual instance, the forward extremities of the entry portions 26 extend slightly beyond the forward end of the casing 16 so as to obtain a full bite of the air during rotation of the casing, scooping air into channels 30 defined between the cooling vanes 22, the casing 16 and the shell 24. This causes the cooling air to be forced therebetween through the length of the passages 30, exiting outward at the discharge region 31 and effectively and efficiently transferring the heat from these components to the air passing therethrough.

It will be apparent that the vanes 22 can be shaped and the passages 30 defined in a manner most desirable to the particular transmission configuration. The shapes and sizes shown and described herein are not intended to be limiting with respect to the potential configurations.

Attached by bolts or screws 32 to the internal periphery 34 of the casing 16 is a jet stream splitter ring 36. This ring, positioned approximately intermediate of the lengthwise direction of casing 16, and shown in full (not sectioned) in FIG. 1 for clarity of illustration, includes a plurality of boss members 38 upon its outer periphery, within which threaded holes 40 are provided to receive the bolts 32. Additionally, a series of spaced extensions or feet 42 are provided upon either extremity of the ring 36 and adapted to engage the internal periphery 34 of the casings 16 so as to provide a firm support for the splitter ring 36 during its rotation with the casing 16 and the drive shaft 12.

By virtue of the aforedescribed construction a free flow of fluid from one side of the splitter ring 36 to the other is accommodated via the passage 52 provided between the splitter ring 36 and the internal casing periphery 34.

Extending radially inward approximately centrally of the splitter ring 36 is a knife-like edge 44 for splitting a jet stream of hydraulic fluid emitted from a rotor structure to be hereinafter described. This splitter edge 44 defines a central termination of the splitter ring structure, surfaces of curvature 46 and 48 being provided as deflector surfaces for the jet streams. This curvature is shaped to most efficiently turn the jet stream approximately 180°, imparting a new direction thereto and facilitating impingement of the jet stream upon a plurality of efficiency vanes to be described.

Opposite the drive shaft 12, in axial alignment therewith and coaxially disposed with respect to the casing 16 and a rotor assembly 56 to be described, is a driven shaft 54.

The driven shaft 54 is mounted in a sealed relationship with respect to the cover 18 and for rotation relative thereto by virtue of the presence of a suitable bearing 58. It is also provided with splines 60, mated with splines 63 upon an internal surface of a bore 63 in the rotor 56. The rotor assembly includes end portions 64 and 66 mutually confining a pair of wear plates 68 and 70, between which are retained a plurality of irregularly-shaped sections 72, the assembly being secured together by a plurality of bolts 74.

Three planetary gears 76 are equally spaced and radially disposed about a central or sun gear 78 which includes stub shafts 79 and 80 extending from either side thereof. These gears cooperatively define a hydraulic fluid pump. Fluid inlet and outlet passages 81 and 82, respectively, feed fluid to and from the pump, the outlet passages 82 being controlled by normally closed valve members 84, biased closed by compression springs 85. The springs are retained by threaded plugs 86 or other appropriate means. All of the foregoing rotor components are assembled substantially as shown and described in my U.S. Pat. No. 2,437,448, except as otherwise described herein.

Figure 5:
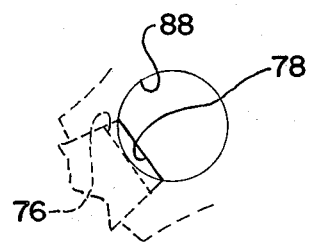
FIG. 5 is an enlarged view of a typical pressure relief hole.

On either side of the point of tangency of the teeth of the planetary gears 76 and the sun 78, when those teeth are fully meshed, are two small pressure relief holes 87 and 88 through the wear plate 70 and the end plate 66. These holes are centrally located on a center line between the sun gear 78 and the respective planet gear 76. The exposed area of such holes 87 and 88 should preferably be a segment, the chord of which is equal to the width of the root diameter groove of the gear (FIG. 5). They are shown representatively only in FIG. 1 to indicate location since they are on the near side of the drawing and, in actuality, would not be seen in this view.

The purpose of these holes is to prevent an excess build-up of pressure in the oil trapped between the gears when the mesh tooth is in or near dead center. Thus, a deficiency encountered in prior art pumps is eliminated. Oil so trapped or entrained has been a major reason for system failure. Sudden build-ups of pressure deliver hammer-like shock blows to the needles making up the bearings. This force is ultimately destructive to the bearings and injurious to other structure components.

Most gear pumps include a relief of this general character. Nevertheless, the specific concept described herein, wherein the size and position of the relief hole permits appropriate relief while not permitting an escape of pressure destructive to the efficiency of the gear pump, provides a definitive improvement.

Affixed to the external periphery of the rotor 56 by bolts 89 are a plurality of hydraulic fluid scoops 90. Each scoop 90 is shaped as a flat tubular section with inlet nozzles 92 and 94 on either end thereof so as to permit the inlet of hydraulic fluid irrespective of the direction of travel of the scoop. A flange 96 on an inner extremity of the scoop 90 extends into a mated fluid passage 81 to facilitate ease of assembly and structural integrity. Internally of each scoop 90 is a deflector section 98 extending radially inward centrally of the scoop. These deflector sections 98 are curved to provide a smooth fluid entrance and turning characteristic from either direction of travel. Thus, the passages defined within the scoops 90, which originate from both ends thereof, provide a similarly blended entry into the passages 81. It will be noted that the scoops 90 include broad inlet regions, the scoop inlets extending over a major portion of the radial distance between the rotor 56 and the casing 16, thereby accommodating a maximum fluid intake. It will also be apparent that the inlet area of the scoops can be modified according to the requirements of the particular design to permit a predetermined quantity of hydraulic fluid to be forced therethrough during rotor rotation. It will additionally be apparent that through the utilization of and efficient fluid pickup of this character, fluid delivered to the pump via the passages 81 is pressurized to varying extent by virtue of fluid flow resulting from rotor rotation and fluid pickup by the scoops. Based upon torque multiplication figures the efficiency vanes increase the torque output of the transmission by approximately forty five percent.

Figure 2:
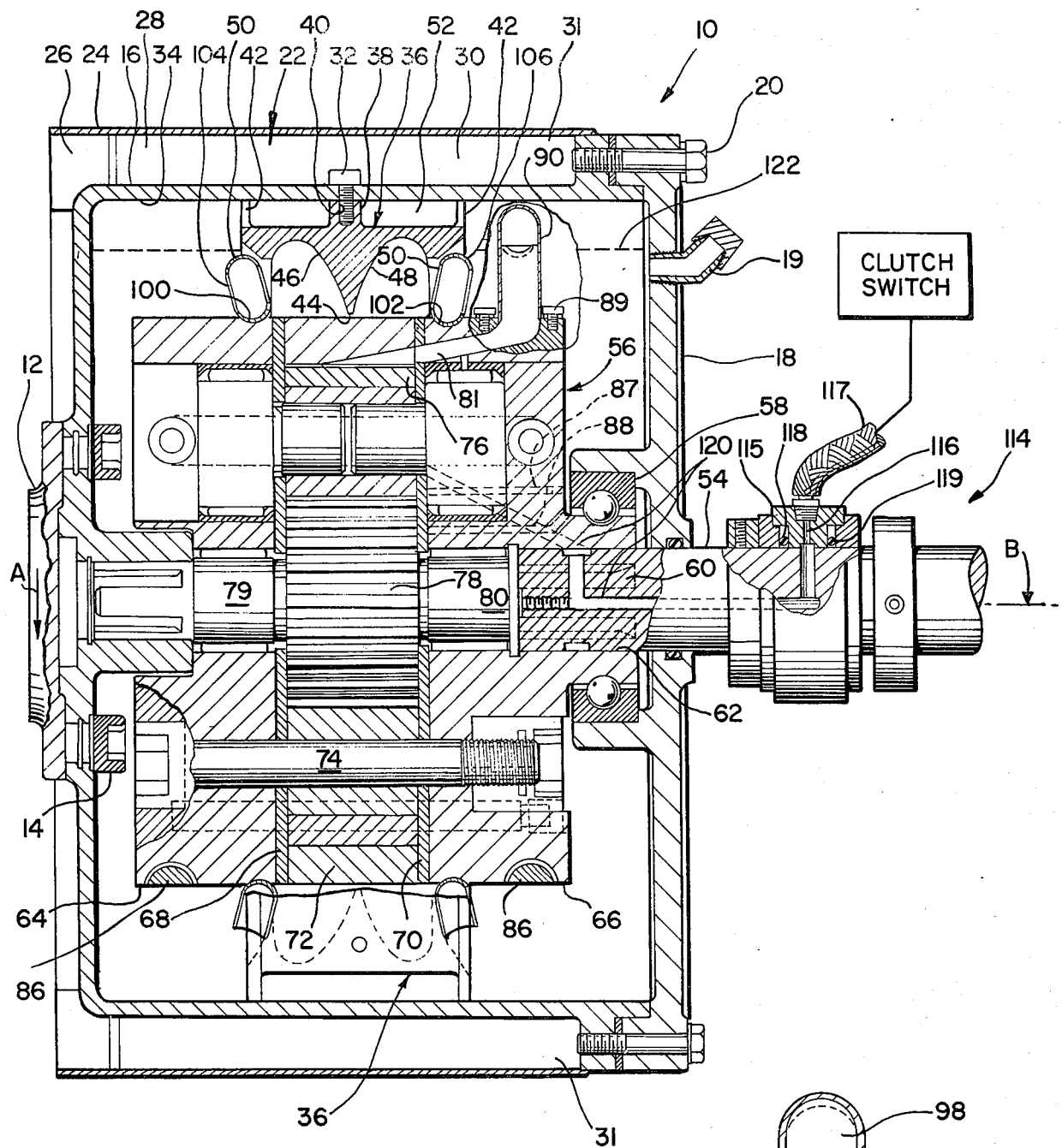
FIG. 2 is a drawing taken generally along the line 2—2 of FIG. 1 and partially cut away.
Figure 3:
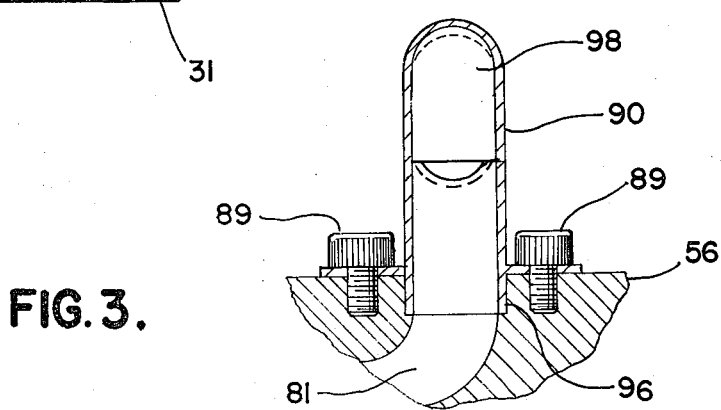
FIG. 3 is a sectional view taken along line 3—3 of FIG. 1, illustrating a typical scoop.

The rotor end portions 64 and 66 respectively include grooves 100 and 102 in their outer peripheries. Positioned partially within the respective grooves 100 and 102 are a plurality of efficiency booster vanes 104 and 106. These vanes are welded or otherwise fixed in this position for rotation with the rotor end portions 64 and 66 for imparting an increased force thereto. Each such vane is positioned adjacent an outlet region of the curved surfaces 46 and 48 of the splitter ring 36, slightly canted, as best illustrated in FIG. 2. Each vane includes a central section 108, a tail section 110 extending outward at an obtuse angle from the central section and a head portion 112 extending from the opposite extremity. Throughout its length each such efficiency booster is curved to best receive hydraulic fluid from the splitter ring, capture the energy available therefrom, and to transmit the same as a force to the rotor 56. All efficiency booster vanes 104 and 106 are identical in construction, thereby facilitating ease of fabrication and installation.

Throughout this improved transmission maximum advantage has been taken of design characteristics available to improve efficiency. For example, as seen in FIG. 1, the fluid inlet passages 81 are designed and directed such that they impart a maximum force to the teeth of the pump gears 76. By virtue of the decreasing cross-sectional area of the passage as the pump region is approached an increased impingement force against the gear teeth is provided. The passage 81 enters tangentially to the rotor region in which the planetary gear 76 is contained. Additionally, the presence of the enhanced fluid scoop, the splitter ring and the efficiency booster rings cooperate to provide a greatly enhanced overall efficiency of the system.

Provided upon the driven shaft 54 is a hydraulic clutch switch 114 having an oil receiver ring 115 containing a manifolded passage 116 and an interconnecting supply line 117 appropriately. The receiver ring 115 is sealed upon the shaft 54, as by Teflon "O" rings 118 and 119. This assembly receives hydraulic fluid from the gear pump via a series of interconnecting passages collectively identified by the numeral 120, for ultimate transmittal of the fluid to a clutch (not shown) via the supply line 117.

Operationally, after the transmission casing 16 is filled with hydraulic fluid through the filler port 19 to approximately the level indicated at 122, this hydraulic transmission will operate automatically, providing an infinite number of speed ratios between the driving and driven shafts, in essentially the manner described in my U.S. Pat. No. 2,437,448. With the drive shaft 12, the casing 16 and the sun gear 78 all interconnected and rotating in the direction of arrow A, the gears 76 are driven in the opposite direction; this by virtue of their engagement with sun gear 78, the presence of fluid between the teeth of the respective meshed gears during their rotation results in a pumping action being applied to the fluid, causing it to be transmitted via the outlet passages 82 to the external periphery of the rotor 56. The fluid pressure thus developed acts against the force of springs 85, which normally closes the valves 84, causing them to overcome and open against that force. The resulting back pressure upon the gears 76 and 78 causes a rotational force to be imparted to the rotor 56, resulting in its rotation in the direction of arrow C in FIG. 1, i.e., counterclockwise, rotating the interconnected drive shaft 54 in the same direction. A load upon the drive shaft 54 similarly applies a load to the rotor, tending to prevent its rotation. This load increases any relative rotation between the gear 78 and the driven shaft 54 and rotor 56, similarly increasing the rotation of the meshed gears 76, pumping additional fluid and developing a higher liquid pressure in the passages 82.

The operation of the springs 85, the valves 84, the respective gears and the inlet and outlet passages is the same as described in my U.S. Pat. No. 2,437,448, the total efficiency of the system, however, being significantly increased by virtue of the existence of the improved components heretofore described and their intercooperation. These improvements result in an extraction of more energy from the working fluid before its final exhaust than has heretofore been possible with prior art devices. It also provides a higher ratio of torque increase, i.e., output torque divided by input torque than available in prior art devices, without the necessity of using externally held deflector means. This system additionally facilitates an unusually smooth transition from high torque mode to virtually a direct drive.

By virtue of the improvements shown in the drawings and described above the objects of invention are effectively accomplished.

I claim:

1. An improved transmission having a rotor supported on a drive shaft, a rotatable rotor casing supporting a driven shaft, the rotor casing sealably surrounding, coaxial with and spaced from the rotor for containing fluid therebetween, the rotor including gear pump means and fluid inlet and outlet passage means leading to and from the pump means, the improvement comprising:

fluid stream splitter means fixed to the casing interiorly thereof for rotation therewith and for dividing fluid from the pump outlet passage means into first and second components, first and second efficiency vane means each comprising a plurality of separate efficiency booster vanes fixed to the rotor circumferentially thereof in adjacently spaced relation from said splitter means on either side thereof and shaped to receive the respective fluid component redirected thereby, capture its energy and transfer it into the rotor, and fluid scoop means fixed to the rotor extends over the major distance between the rotor and the casing, includes bi-directional fluid intake means, fluid turning means, and communicates with the fluid inlet passage means, said fluid scoop means being axially displaced from said fluid stream splitter means, the fluid inlet passage means being disposed in said rotor at a double acute angle in relation to said pump means.

2. The improved hydraulic transmission of claim 1 wherein cooling fins are fixed exteriorly to the rotor casing at an acute angle with respect to the rotational axis of the rotor.

3. The improved hydraulic transmission of claim 1 wherein
said fluid stream splitter means includes a pair of surface elements converging toward the rotor and is positioned to receive and split fluid discharge from the fluid outlet passage means into substantially equal components, and configured to turn said fluid components into impingement with said efficiency vane means, and
said fluid stream splitter means is a ring member supported in spaced relation from the rotor casing, said surface elements being configured to turn said fluid components approximately 180°.

4. The improved hydraulic transmission of claim 1 wherein
a plurality of said efficiency vanes are provided in each of two rings circumferential about said rotor and upon either side of said fluid stream splitter means.

5. In a hydraulic transmission having a drive member and a driven member, a rotor mounted on and for rotation with the driven shaft, a closed casing mounted on and for rotation with the drive shaft and coaxially disposed about and in spaced and sealed relation to the rotor, gear pump means and inlet and outlet passage means to and from the pump being provided in the rotor, the outlet passage means being capable of discharging fluid under substantially constant liquid pressure and at an angle to a plane through the rotor axis, the improvement comprising;

a fluid splitter upon the casing for separating the fluid stream exhausted from the pump into substantially equal components, turning the same approximately 180°, a plurality of efficiency vanes fixed to an external periphery of the rotor on each side of said fluid splitter, said vanes on each side of said splitter adapted to receive one such fluid component and impart the energy therefrom into the rotor, a plurality of fluid scoops attached to said rotor at one end thereof, having bi-directional fluid inlets, and extending into near adjacency to the interior of the casing, deflector means in said scoop for redirecting fluid from said scoops into the pumps, the inlet passage means in the rotor adapted for receiving fluid from the scoops and directing such fluid tangentially against gears upon the gear pump, each said inlet passage means being of lesser cross section at its outlet than at its inlet, a plurality of cooling fins fixed to the exterior of the casing, said fins each including an entry portion positioned at an angle with respect to the casing axis and into the direction of rotation thereof, and a flow control portion extending at an angle from said entry portion and with respect to the casing axis, and shell means surrounding said fins and defining air cooling channels with said fins and the casing.

6. An improved transmission having a rotor supported on a drive shaft, a rotatable rotor casing supporting a driven shaft, the rotor casing sealably surrounding, coaxial with and spaced from the rotor for containing fluid therebetween, the rotor including gear pump means and fluid inlet and outlet passage means leading to and from the pump means, the improvement comprising:

fluid stream splitter means fixed to the casing interiorly thereof for rotation therewith and for dividing fluid from the pump outlet passage means into components;

efficiency vane means fixed to the rotor in adjacently spaced relation from said splitter means shaped to receive fluid redirected thereby, capture its energy and transfer it into the rotor;

fluid scoop means fixed to the rotor extends over the major distance between the rotor and the casing, includes bi-directional fluid intake means, fluid turning means, said fluid scoop means being axially displaced from said fluid stream splitter means, the fluid inlet passage means being disposed in said rotor at a double acute angle in relation to said pump means, cooling fins fixed exteriorly to the rotor casing at an acute angle with respect to the rotational axis of the rotor; and a shell member surrounding and rotatable with said cooling fins and defining a plurality of passages with said fins and said rotor casing.

7. An improved transmission having a rotor supported on a drive shaft, a rotatable rotor casing supporting a driven shaft, the rotor casing sealably surrounding, coaxial with and spaced from the rotor for containing fluid therebetween, the rotor including gear pump means and fluid inlet and outlet passage means leading to and from the pump means, the improvement comprising:

fluid stream splitter means fixed to the casing interiorly thereof for rotation therewith and for dividing fluid from the pump outlet passage means into components;

efficiency vane means fixed to the rotor circumferentially thereabout in adjacently spaced relation from said splitter means shaped to receive fluid redirected thereby, capture its energy and transfer it into the rotor;

fluid scoop means fixed to the rotor extends over the major distance between the rotor and the casing, includes bi-directional fluid intake means, fluid turning means, said fluid scoop means being axially displaced from said fluid stream splitter means, the fluid inlet passage means being disposed in said rotor at a double acute angle in relation to said pump means; and pressure relief means for the gear pump means disposed in the rotor, said pressure relief means comprising, hole means in said rotor leading from regions in the pump where gear teeth thereof are fully meshed, said hole means exposing to vent a segment of gear tooth, the chord of which is equal to the width of the root diameter groove of the gear.

8. An improved transmission having a rotor supported on a drive shaft, a rotatable rotor casing supporting a driven shaft, the rotor casing sealably surrounding, coaxial with and spaced from the rotor for containing fluid therebetween, the rotor including gear pump means and fluid inlet and outlet passage means leading to and from the pump means, the improvement comprising:

fluid stream splitter means fixed to the casing interiorly thereof for rotation therewith and for dividing fluid from the pump outlet passage means into components, booster vane means fixed to the rotor in adjacently spaced relation from said splitter means shaped to receive fluid redirected thereby, capture its energy and transfer it into the rotor, fluid scoop means fixed to the rotor extends over the major distance between the rotor and the casing, includes bi-directional fluid intake means, fluid turning means, said fluid scoop means being axially displaced from said fluid stream splitter means, the fluid inlet passage means being disposed in said rotor at a double acute angle in relation to said pump means;

a hydraulic clutch switch disposed on the driven shaft, and interconnecting passage means in said rotor, said driven shaft and said hydraulic clutch switch and leading from the gear pump means in the transmission whereby pressurized fluid is supplied by the pump means to an independent clutch.

9. The improved hydraulic transmission of claim 8 wherein said hydraulic clutch switch is positioned circumferentially about the driven shaft in fluid sealed relation and adapted for restricted axial movement thereover to align and misalign said interconnecting passage means for off and on positions of said switch.

10. An improved transmission having a rotor supported on a drive shaft, a rotor casing supporting a driven shaft, the rotor casing sealably surrounding, coaxial with and spaced from the rotor for containing fluid therebetween, the rotor including gear pump means and fluid inlet and outlet passage means leading to and from the pump means, the improvements comprising:

fluid stream splitter means fixed to the casing interiorly thereof for rotation therewith and for dividing fluid from the pump outlet passage means into components, efficiency vane means fixed to the rotor in adjacently spaced relation from said splitter means to receive fluid redirected thereby, capture its energy and transfer it into the rotor, substantially chevron-shaped cooling fins are fixed exteriorly of the rotor casing at an angle with respect to the rotational axis of the rotor, the leading edges thereof extending axially beyond an end of the rotor casing, and a shell member surrounds said cooling fins and defines a plurality of passages with said fins and said rotor casing.

11. An improved transmission having a rotor supported on a drive shaft, a rotor casing supporting a driven shaft, the rotor casing sealably surrounding, cozxial with and spaced from the rotor for containing fluid therebetween, the rotor including gear pump means and fluid inlet and outlet passage means leading to and from the pump means, the improvements comprising:

fluid stream splitter means fixed to the casing interiorly thereof for rotation therewith and for dividing fluid from the pump outlet passage means into components, a plurality of efficiency vanes fixed to the rotor in two rings circumferentially about said rotor upon either side of and in adjacently spaced relation from said fluid stream splitter means to receive fluid redirected thereby, capture its energy and transfer it into the rotor, each said efficiency vane being channel-shaped and including, a central section attached to the rotor;

a head portion curved approximately 180° from said central section; and a tail portion extending radially outward from the rotor at an acute angle from central section;

said tail of one said vane being juxtaposed against the next adjacent said vane.

12. The improved hydraulic transmission of claim 11 wherein said efficiency vanes are canted at acute angles from a radial plane through the rotor normal to its axis to receive energy from the fluid stream and transmit it to the rotor.

* * * * *